United States Patent [19]

Cheney et al.

[11] Patent Number: 5,566,720
[45] Date of Patent: Oct. 22, 1996

[54] ELONGATED FUEL AND VAPOR TUBE HAVING MULTIPLE LAYERS AND METHOD OF MAKING THE SAME

[75] Inventors: Craig Cheney, Lapeer; Frank L. Mitchell, Rochester, both of Mich.

[73] Assignee: ITT Corporation, New York, N.Y.

[21] Appl. No.: 370,603

[22] Filed: Jan. 10, 1995

[51] Int. Cl.⁶ ..................................................... F16L 11/04
[52] U.S. Cl. ........................... 138/137; 138/140; 138/141
[58] Field of Search ............................ 138/137, 123–126, 138/DIG. 3, DIG. 7, 140, 141

[56] References Cited

U.S. PATENT DOCUMENTS

| | | | |
|---|---|---|---|
| 3,070,132 | 12/1962 | Sheridan | 138/118 |
| 3,473,087 | 10/1969 | Slade | 317/2 |
| 3,561,493 | 2/1971 | Maillard et al. | 138/141 |
| 3,828,112 | 8/1974 | Johansen et al. | 174/47 |
| 3,907,955 | 9/1975 | Viennot | 264/105 |
| 4,059,847 | 11/1977 | Phillips et al. | 361/215 |
| 4,243,724 | 1/1981 | Strutzel et al. | 428/474.7 |
| 4,244,914 | 1/1981 | Ranalli et al. | 264/515 |
| 4,272,585 | 6/1981 | Strassel | 428/413 |
| 4,273,798 | 6/1981 | Scheiber | 427/27 |
| 4,303,457 | 12/1981 | Johansen et al. | 156/149 |
| 4,330,017 | 5/1982 | Satoh et al. | 138/126 |
| 4,448,748 | 5/1984 | Radtke et al. | 420/514 |
| 4,614,208 | 9/1986 | Skarelius | 138/103 |
| 4,675,780 | 6/1987 | Barnes et al. | 361/215 |
| 4,685,090 | 8/1987 | Krevor | 367/20 |
| 4,706,713 | 11/1987 | Sadamitsu et al. | 138/137 |
| 4,762,589 | 8/1988 | Akiyama et al. | 156/307.3 |
| 4,800,109 | 1/1989 | Washizu | 428/34.9 |
| 4,853,297 | 8/1989 | Takahashi et al. | 428/623 |
| 4,880,036 | 11/1989 | Kitami et al. | 138/137 |
| 4,887,647 | 12/1989 | Igarashi et al. | 138/126 |
| 4,907,625 | 3/1990 | Ito et al. | 138/126 |
| 4,944,972 | 7/1990 | Blembereg | 428/35.2 |
| 4,948,643 | 8/1990 | Mueller | 428/36.6 |

(List continued on next page.)

FOREIGN PATENT DOCUMENTS

| | | |
|---|---|---|
| 0551094 | 7/1993 | European Pat. Off. . |
| 2577168 | 8/1986 | France . |
| 2577564 | 8/1986 | France . |
| 1779905 | 2/1972 | Germany . |
| 3821723 | 9/1989 | Germany . |
| 9007303 | 12/1990 | Germany . |
| 4001125 | 12/1990 | Germany . |
| 4001126 | 12/1990 | Germany . |
| 3942354 | 6/1991 | Germany . |
| 4006870 | 7/1991 | Germany . |
| 4214383 | 9/1993 | Germany . |
| 9400522 | 1/1994 | Germany . |
| 2204376 | 11/1988 | United Kingdom . |

OTHER PUBLICATIONS

Tefzel—Safety in Handling And Use, pp. 1–3, 20–21, 35–37.
Rosato, Donald V. et al., Designing with Plastic and Composites: A Handbook, pp. B–18—B–33, 1991 copyright.
Non Mettallic Air Brake System Tubing—SAEJ844, Jun. 1990, SAE Standard.
Kirk–Othmer, Encyclopedia of Chemical Technology, 3rd Edition, vol. 18 (New York, John Wiley & Sons), pp. 406–425, 1982 copyright.
Conductive Polymers And Plastics (Chapman and Hall, New York), James M. Margolis, pp. 119–124.

Primary Examiner—Patrick Brinson
Attorney, Agent, or Firm—Robert P. Seitter; J. Gordon Lewis

[57] ABSTRACT

An elongated fuel and vapor tube suitable for conveying fluids containing hydrocarbons having a first layer disposed radially innermost and having an inner surface capable of prolonged exposure to the hydrocarbon-containing fluid made up of a melt processible fluoroplastic terpolymer composed of a polyfluorinated alkylene, an α-fluoro-olefin and a fluorinated vinyl compound and a second layer bonded directly to the outwardly oriented face of the first layer. The second layer is composed of a resinous thermoplastic material which is preferably a polyamide such as Nylon 12, Nylon 11, Nylon 6 or Nylon 6.6.

29 Claims, 2 Drawing Sheets

U.S. PATENT DOCUMENTS

| | | | |
|---|---|---|---|
| 4,984,604 | 1/1991 | Nishimura | 138/126 |
| 4,990,383 | 2/1991 | Bergström et al. | 428/35.9 |
| 5,019,309 | 5/1991 | Brunnhofer | 264/103 |
| 5,038,833 | 8/1991 | Brunnhofer | 138/137 |
| 5,076,329 | 12/1991 | Brunnhofer | 138/137 |
| 5,112,692 | 5/1992 | Strassel et al. | 428/421 |
| 5,142,782 | 9/1992 | Martucci | 29/890.144 |
| 5,143,122 | 9/1992 | Adkins | 138/109 |
| 5,167,259 | 12/1992 | Brunnhofer | 138/137 |
| 5,170,011 | 12/1992 | Martucci | 174/47 |
| 5,219,002 | 6/1993 | Stenger et al. | 138/118.1 |
| 5,219,003 | 6/1993 | Kerschbaumer | 138/137 |
| 5,284,184 | 2/1994 | Noone et al. | 138/121 |
| 5,356,681 | 10/1994 | Ichikawa et al. | 138/137 X |
| 5,373,870 | 12/1994 | Derroire et al. | 138/125 |
| 5,380,385 | 1/1995 | Derroire et al. | 156/149 |

ELONGATED FUEL AND VAPOR TUBE HAVING MULTIPLE LAYERS AND METHOD OF MAKING THE SAME

FIELD OF THE INVENTION

This invention pertains to multiple layer hoses for use in a motor vehicle. More particularly, the present invention relates to a dual layer hose having a fluoropolymer inner layer which can be employed as a fuel line or a vapor recovery line in a motor vehicle.

BACKGROUND OF THE INVENTION

Single layer or monowall fuel lines and vapor return lines constructed of synthetic materials such as polyamide have been proposed and employed. Fuel lines employing such materials generally have length of at least several meters. It is important that the line, once installed, not materially change during the length of operation, either by shrinkage or elongation as a result of the stresses to which the line may be subject during use. Heretofore, monowall tubing composed of fluoroplastic materials has not been desirable due to the dimensional instability of the fluoroplastic materials during usage over time.

It is also becoming increasingly important that the fuel and vapor return lines employed be essentially impervious to hydrocarbon emissions due to permeation through the tubing. It is anticipated that future federal and state regulations will fix the limit for permissible hydrocarbon emissions due to permeation through such lines. Regulation which will be enacted in states such as California will fix the total passive hydrocarbon emission for a vehicle at 2 $g/m^2$ per 24 hour period as calculated by evaporative emission testing methods such as those outlined in Title 13 of the California Code of Regulations, §1976, proposed amendment of Sep. 26, 1991. In order to achieve the desired total vehicle emission levels, a passive hydrocarbon permeation level for fuel and vapor return lines equal to or below 0.5 $g/m^2$ per twenty-four hour period would be highly desirable, if not required. Heretofore, it has been difficult to meet the passive hydrocarbon permeation levels outlined with tubing of monowall polyamide construction. However, as indicated previously, these materials fail to provide the dimensional stability and rugged durability characteristics necessary for fuel and vapor return lines. Additionally, while the fluoroplastic polymers provide greater resistance to hydrocarbon permeation, it has not been definitively proven that these materials, when employed in monowall construction, provide sufficient permeation resistance to meet the new stricter standards.

Additionally, any material employed in a fuel or vapor recovery line which contact the organic material transported therein must be impervious to interaction with the fuel and with materials present therein such as oxidative agents and surfactants as well as fuel additives such as methanol and ethanol.

In the past, various multiple layer tubing has been proposed in an attempt to address this final concern as well as those previously discussed. In general, the most successful of these have been multi-layer tubing which employ a relatively thick outer layer composed of a material resistant to hazards found in the exterior environment, i.e. UV degradation, road hazard, extreme of heating and cooling, corrosive agents such as zinc chloride and the like. The innermost, fuel contacting, layer is thinner and is generally composed of a material chosen for its ability to block diffusion of materials contained in the fuel to the thick outer layer. Materials for which diffusion is blocked include aliphatic hydrocarbons, alcohols and other materials generally present in fuel blends. The material of choice for the inner layer generally has been a polyamide such as Nylon 6, Nylon 6.6, Nylon 11 and Nylon 12.

Alcohol and aromatic compounds diffuse through the tubing wall at different rates from aliphatic compounds contained in the fuel. This diffusion differential results in a change in the composition of the liquid contained in the fuel or vapor recovery tube which, in turn, can change the solubility threshold of the tubing material. The change in the solubility threshold of the tubing material can result in the crystallization of monomers and oligomers of materials such as Nylon 11 and Nylon 12 into the fuel liquid. The presence of copper ions in the fuel which are introduced from copper present in the fuel pump, can accelerate this crystallization. The crystallized precipitant can block filters and fuel injectors and collect to limit the travel of mechanisms such as the fuel pump or carburetor float. Additionally, crystallized precipitant can build up on critical control surfaces of the fuel pump.

Various tubing materials have been suggested to address these concerns. In U.S. Pat. No. 5,076,329 to Brunnhofer, a five-layer fuel line is proposed which is composed of a thick corrosion-resistant outer layer formed of a material which is durable and resistant to environmental degradation such as Nylon 11 or Nylon 12. Intermediate to this outer layer and protected from environmental degradation is a thick intermediate layer composed of conventional Nylon 6. The outermost and intermediate layers are bonded together by a thin intermediate bonding layer composed of an ethylene or a polypropylene having active side chains of maleic acid anhydride. A thin innermost fuel contacting layer of after condensed Nylon 6 with a low monomer content is bonded to the intermediate Nylon 6 layer by a solvent blocking layer formed of a co-polymer of ethylene and vinyl alcohol having an ethylene content between about 30% and about 45% by weight. In order to achieve bonding between the different polyamides, the specific bonding layers are employed. The use of the five-layer system was mandated in order to obtain a tubing with the exterior resistance characteristics of Nylon 12 and the low monomer/oligomer production characteristic of Nylon 6.

In U.S. Pat. No. 5,028,833 also to Brunnhofer, a three-layer fuel line is proposed in which a multi-layer tube is formed having a co-extruded outer exterior environmental contacting wall of Nylon 11 or Nylon 12, an inner water-blocking wall of Nylon 11 or Nylon 12 and an intermediate alcohol barrier and bonding layer formed of an ethylene-vinyl alcohol copolymer. In DE 40 06 870, a fuel line is proposed in which an intermediate solvent barrier layer is formed of unmodified Nylon 6.6 either separately or in combination of blends of polyamide elastomers. The internal layer is also composed of polyamides preferably modified or unmodified Nylon 6. The outer layer is composed of either Nylon 6 or Nylon 12.

Various devices have also been suggested in which a fluoropolymer is employed as an interior layer in a multi-layered tubing. In EP 0551094 A1 to Krause, a two or three layer fuel line is proposed in which the innermost layer is a fluoropolymer. The fluoropolymer of choice is, preferably, an ethylene tetrafluoroethylene co-polymer extruded and rendered surface active by plasma discharge or corona discharge. A top layer composed of a thermoplastic resinous material such as Nylon 12 is extruded onto the previously formed inner layer. In U.S. Pat. No. 5,170,011 to Martucci, a lightweight hose assembly is suggested in which the inner layer is a polymeric fluorocarbon while the outer layer is an expanded polyamide material. In order to achieve an appropriate permanent bond between the two layers, an intermediate braiding or, alternately, an abraded surface preparation must be prepared in the exterior face of the fluoropolymer layer so that a mechanical bond can be obtained with the polyamide material. Heretofore, it has been impossible to provide a dual or multiple layer tubing with satisfactory lamination characteristics between the dissimilar polymer layers.

Thus, it would be desirable to provide a tubing material which could be employed in motor vehicles which would be durable and have an exterior oriented surface which is resistant to environmental degradation and durable through prolonged use. It would also be desirable to provide a tubing which would reduce permeation of organic materials therethrough. It would also be desirable to provide a tubing material which would be essentially non-reactive with components of the fuel being conveyed therein. It is also an object of the present invention to provide a method for preparing a multi-layer tubing of the present invention by coextrusion.

SUMMARY OF THE INVENTION

The present invention is an elongated tube for connection to a motor vehicle system to transport fluids containing hydrocarbons from point to point. Such elongated tubes could be employed as part of a fuel line, a vapor return line or a vapor recovery line. The elongated tube of the present invention includes a first layer disposed radially innermost and having an inner surface capable of prolonged exposure to fluids containing hydrocarbons and an outer surface spaced a predetermined radial thickness from the inner surface. The first layer is composed of a fluoroplastic material having a melt temperature between about 160° and about 200° C. and a specific gravity between about 1.95 and about 1.98. The preferred fluoroplastic material is a terpolymeric material containing tetrafluoroethylene, vinylidine difluoride and hexafluoropropylene.

A second layer has a second predetermined radial thickness greater than the thickness of the first layer. The second layer has an inner face capable of sufficiently laminar adhesion to the first layer and an outer surface opposed thereto. The second layer consists essentially of an extrudable, melt-processible thermoplastic material. The outer surface of the second layer preferably is directly contactable with the surrounding environment external to the tubing of the present invention.

In a first embodiment of the present invention, the first layer is an essentially unitary layer. In the second embodiment, the first layer is made up of two sublayers; the radially innermost sublayer composed of a fluoroplastic material having a melt temperature between about 160° and 200° C. and a specific gravity between about 1.95 and about 1.98. The preferred fluoroplastic material is a terpolymeric material containing tetrafluoroethylene, vinylidine difluoride and hexafluoropropylene. In this second embodiment, the innermost sublayer is capable of dissipating electrostatic energy in a range between about $10^4$ to $10^{10}$ ohm/cm². The first layer has a second sublayer disposed radially outward of the innermost layer composed of the fluoroplastic material employed in the innermost sublayer without the electrostatic dissipation characteristics.

Other objects, advantages and applications of the present invention will become apparent to those skilled in the art when the following description of the best mode contemplated for practicing the invention is read in conjunction with the accompanying drawings.

BRIEF DESCRIPTION OF THE DRAWINGS

The objects, features and advantages of the present invention will become more readily apparent from the following description, reference being made to the following drawing in which.

DESCRIPTION OF THE PREFERRED EMBODIMENT

Figure 1:
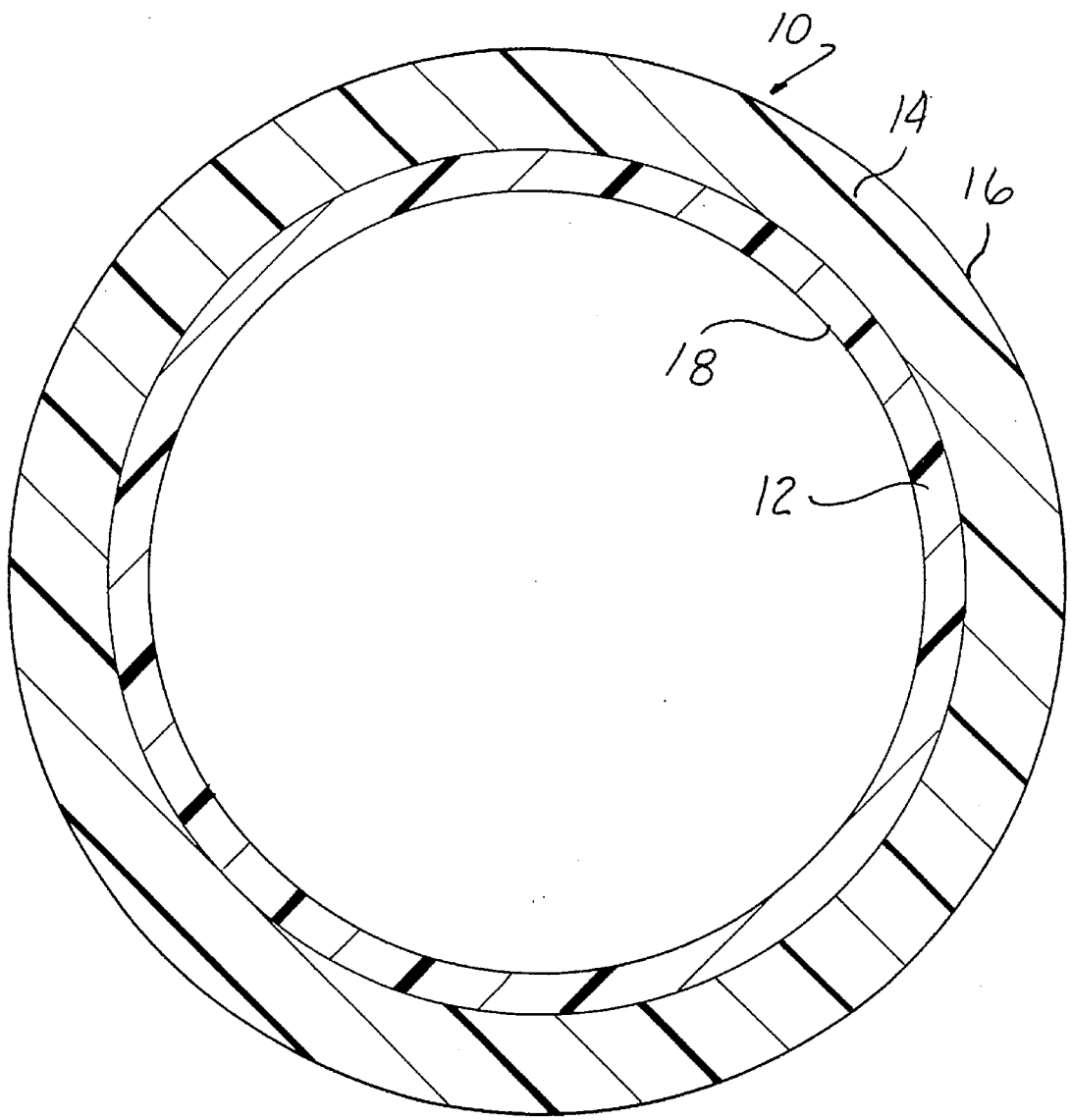
FIG. 1 is a sectional view through a piece of tubing of the first embodiment of the present invention.
Figure 2:
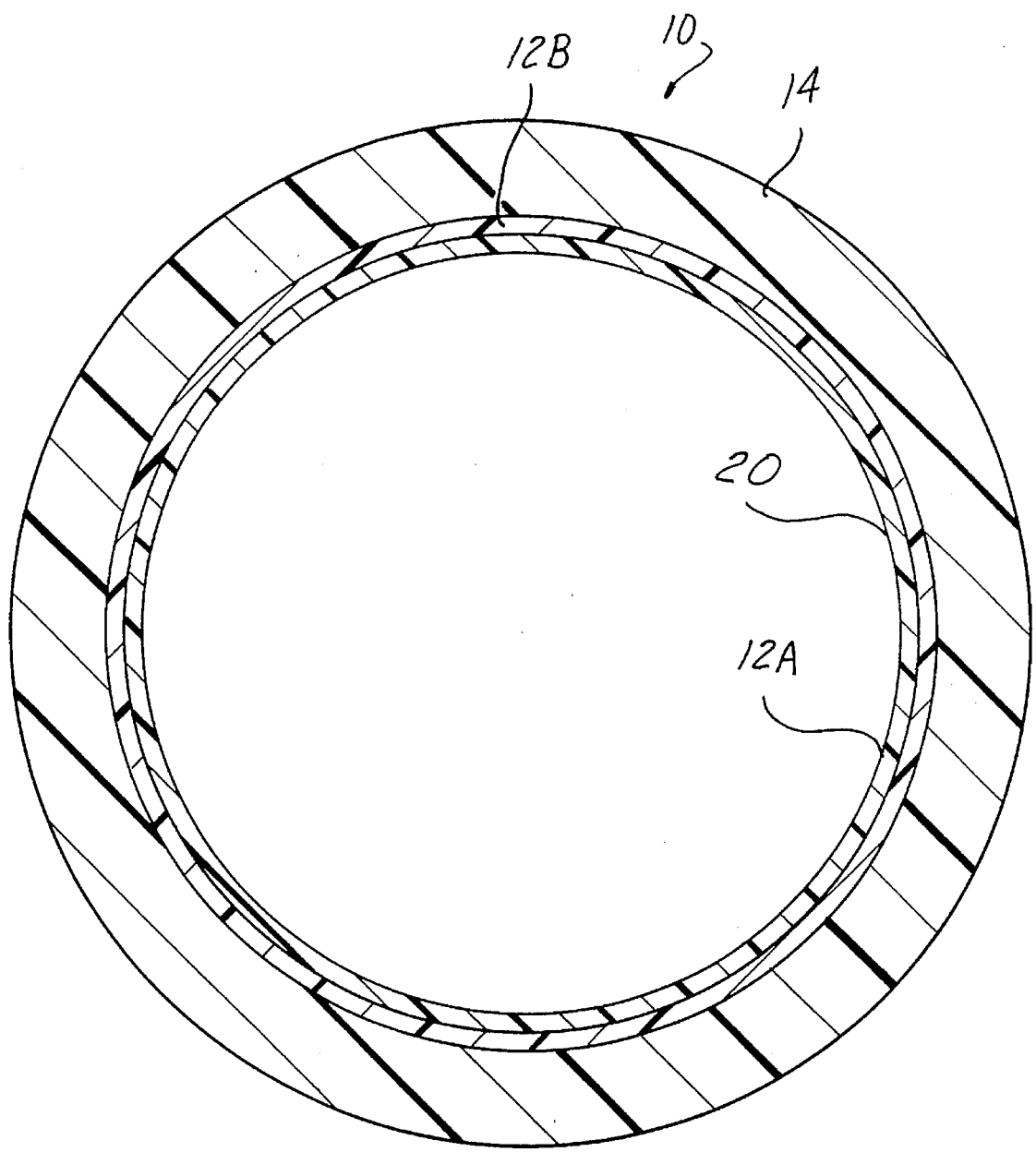
FIG. 2 is a sectional view through a piece of tubing of the second embodiment of the present invention.

The present invention is an elongated fuel and vapor tube 10 suitable for connection to a motor vehicle system to transport fluids particularly those containing hydrocarbons from point to point. The elongated fuel and vapor tube 10 of the present invention includes an inner or first layer 12 and at least one outer or second layer 14. The tube 10 of the present invention is fabricated by a suitable co-extrusion process; one such process will be described in greater detail subsequently. The tube 10 may either be co-extruded to a suitable length or may be co-extruded in continuous length and cut to fit the given application subsequently. The tube 10 of the present invention may have an outer diameter up to 50 mm. However, in a application such as fuel lines and vapor recovery systems, outer diameters up to about 2 inches are preferred.

The elongated fuel and tube 10 of the present invention may have any suitable wall thickness desired. Fuel lines and vapor recovery tubes 10 employed in automotive systems will generally have wall thicknesses between about 0.5 mm and about 2 mm with wall thicknesses of approximately 0.8 to approximately 1.5 mm being preferred. In the tube 10 of the present invention, it has been found that wall thicknesses between about 0.8 mm and about 1 mm exhibit characteristics of durability and stability and unexpected resistance to hydrocarbon permeation over conventional polymeric fuel and vapor tubes. It is believed that this is due, in large part, to the unique layered structure of the tube 10 of the present invention.

The tube 10 of the present invention is suitable for use in motor vehicles and comprises an inner layer 12 and a relatively thick outer layer 14 having an outwardly oriented outermost surface 16. The outer layer 14, and in particular, the outwardly oriented surface 16 is essentially non-reactive with the external environment and can withstand various shocks, vibrational fatigue, and changes in temperature as well as exposure to various corrosive or degradative compounds to which it would be exposed through the normal course of operation of the motor vehicle.

The tube 10 of the present invention, composed of the inner layer 12 and the outer layer 14, is suitable for use at an outer surface temperature range of about −40° C. and about 150° C., with a range of −20° C. to 120° C. being preferred. The tube 10 prepared according to the present invention will have a tensile strength of no less than 15 N/mm² and an elongation value of at least 150% at 23° C. The tube 10 of the present invention has a burst strength at 23° C. and 120° C. of at least 20 bar and is sufficiently resistant to exposure to break fluid, engine oil and peroxides such as those which may be found in gasoline.

In the first embodiment, the inner layer 12 is positioned radially innermost of all succeeding layers. The inner layer 12 has an inner surface 18 oriented to come into direct contact with the fuel or gaseous material conveyed through tube 10. The inner layer 12 is composed of a thermoplastic fluoropolymer which exhibits resistance to the components contained in conventional gasoline fuel mixtures including, but not limited to, alcohols such as methanol and ethanol, peroxides, short-chain hydrocarbons and the like. The fluoropolymer of choice employed in the present invention has a melt temperature between about 160° and 200° C.; and a melt temperature between about 165° and 180° C. being most preferred. The specific gravity of material employed in the first inner layer 14 is, between 1.95 and 1.98. The preferred fluoropolymer is a multi-component system having as its three major components an alkylene fluoropolymer, a material made from a fluoro-olefin monomer or monomers and a vinyl fluoride material. Such materials are reacted by a suitable process to form a terpolymeric material. Various terpolymeric materials are commercially available for use in coextrusion processes to form the tube 10 of the present invention. Selection of such material suitable for use would be within the purview of the skilled artisan after reading this disclosure.

Suitable fluorinated alkylene fluoropolymers employed in the terpolymer have between 2 and 4 carbon atoms and between 2 and 4 fluorine atoms. These include tetrafluoroethylene, polychlorotrifluoroethylene, polytetrafluoroethylene, and perfluoroalcoxyethylene. Fluoro-olefin monomers which can be employed in the terpolymeric material employed in the inner layer 12 contain hydrogen atoms as well as fluorine atoms, generally have 2 to 6 carbon atoms by and between 2 and 6 fluorine atoms and are selected from the group consisting of hexafluoropropene, perfluorobutene, perfluoroisobutene and trifluoroethylene. Halogen-containing 2 fluoro-olefins such as trifluorochloroethylene, 1,1 difluoro 2,2 dichloroethylene, 1,2 difluoro-1,2 dichloroethylene and trifluorobromoethylene can also be employed as the fluoro-olefin monomer. Suitable vinyl fluoride compounds which can be employed in the terpolymeric material include those selected from the group consisting of vinylidene fluoride, vinylfluoride, polyvinylidene difluoride, and polyvinylfluoride.

In both the first and second embodiments, the thermoplastic fluoropolymeric material employed in the inner layer 12 is a terpolymeric composition in which the three respective constituents are present in relative concentrations such that the terpolymeric material has a melt temperature and density in the previously specified ranges. Preferably, the fluorocarbon terpolymeric material employed in inner layer 12 is made up of vinylidene fluoride, hexafluoropropene, and tetrafluoroethylene. The preferred terpolymeric composition has a specific gravity between 1.95 and 1.98. The melting range of the material is between 165° and 180° C. with a tensile stress at break as determined by ASTM 638 of 20 N/m$^2$. The material of choice has an elongation at break as determined by ASTM 638 of between 500% and 600%. In the first embodiment, as shown in FIG. 1, the inner layer 12 is a single layer composed of the terpolymeric material.

In the second embodiment, the inner layer 12 consists of two sublayers: a radially innermost sublayer 12A having an inner surface 20 oriented to come into direct contact with the fuel or gaseous material conveyed through tube 10, and a secondary sublayer 12B disposed radially outward of the innermost sublayer 12A.

In the second embodiment, both the innermost sublayer 12A and the secondary sublayer 12B are composed of a thermoplastic fluoropolymer exhibiting resistance to the components contained in conventional gasoline fuel mixtures including, but not limited to, peroxides, short-chain hydrocarbons, alcohols such as ethanol and methanol, and the like. The fluoropolymer of choice as employed in the present invention has a melt temperature range between about 160° and 200° C. with a melt temperature range between 165° and 185° C. being preferred. The specific gravity of the material employed in the innermost sublayer 12A and the secondary sublayer 12B is between 1.95 and 1.98; with the preferred fluoropolymer for the two sublayers being a multi-component system having as its three major components an alkylene fluoropolymer, a material made from fluoro-olefin monomers and a vinyl fluoride material to form a terpolymer.

Preferably, the innermost sublayer 12A and the secondary sublayer 12B in the second embodiment are made of the same terpolymeric material as outlined in connection with the first embodiment with the differences noted subsequently. Thus, suitable fluorinated alkylene fluoropolymers which can be employed in the terpolymer include tetrafluoroethylene, polychlorotrifluoroethylene, polytetrafluoroethylene and perfluoroalcoxyethylene. Alpha fluoro-olefin monomers which can be employed in the terpolymer contain hydrogen as well as fluorine atoms, generally have 2 to 6 carbon atoms and between 2 and 6 fluorine atoms. Such alpha-fluoro-olefins are selected from the group consisting of hexafluoropropene, perfluorobutene, perfluorosubutene and trifluoroethylene. Halogen-containing 2 fluoro-olefins such as trifluorochloroethylene, 1,1 difluoro 2,2 difluoro-2,2 dichloroethylene, 1,2 difluoro-1,2 dichloroethylene, and trifluorobromoethylene can also be employed as the fluoro-olefin monomer. Suitable vinyl fluoride compounds which can be employed in the terpolymer include those selected from the group consisting of vinylidene fluoride, vinyl fluoride, polyvinylidene difluoride, and polyvinylfluoride.

In the second embodiment, the thermoplastic fluoropolymer is, preferably, a terpolymeric compound in which the three respective constituents are present in relative concentrations such that the terpolymeric material has a melt temperature and a density in the ranges previously specified. Preferably, the terpolymeric material employed in the innermost sublayer 12A and the secondary layer 12B is made up of vinylidene fluoride, hexafluoropropene and tetrafluoroethylene. In the second embodiment, the terpolymeric material has a specific gravity between 1.95 and 1.98. The melting point, elongation at break and other salient characteristics are essentially identical to those previously enumerated with respect to the material employed in the inner layer 12 in the first embodiment.

Examples of commercially available materials suitable for use in the inner layer 12 in the first embodiment and in the secondary sublayer 12B in the second embodiment include KYNAR 9300 and KYNAR 9301; a hexafluoropropene, tetrafluoroethylene, vinylidene fluoride terpolymer commercially available from Atochem-North America and THV 500G, a fluoroplastic hexafluoropropene, tetrafluoroethylene, vinylidene fluoride terpolymer available from Minnesota Manufacturing and Mining, Inc., Industrial Chemical Products Division, St. Paul, Minn. Typical characteristics for these materials are set forth in Table I.

The innermost sublayer 12A in the second embodiment of the present invention is capable of electrostatic dissipation in a range between about $10^4$ to $10^{10}$ ohm/cm$^2$. To obtain the desired electrostatic dissipation, the terpolymeric fluoroplastic material employed preferably includes in its composition conductive media in sufficient quantity to permit electrostatic dissipation in the range defined. The conductive media is suitable material of a composition and shape capable of effecting static dissipation selected from the group consisting of elemental carbon, stainless steel, highly conductive metals such as copper, silver, gold, nickel, silicon and mixtures thereof. The term "elemental carbon" as used herein is employed to describe and include materials commonly referred to as "carbon black". The carbon black can be present in the form of carbon fibers, powders, spheres, and the like.

The amount of conductive material contained in the fluoroplastic terpolymer is generally limited by considerations of low temperature durability and resistance to degradative effects of gasoline, other fuels or components thereof passing through the tubing 10. In the second embodiment of the present invention, the fluoroplastic terpolymeric material employed in the innermost sublayer 12A contains conductive material in an amount sufficient to effect electrostatic dissipation. However, the maximum amount employed therein is less than 5% by volume, with an amount between 2% and 4% being preferred.

Without being bound by any theory, it is believed that the conductive material is present in the innermost sublayer 12A in a random, essentially uniform manner. To achieve this, fluoroplastic terpolymeric materials containing conductive material can be commerically obtained which can be co-extruded with the materials employed in the secondary sublayer 12B and the outer layer 14 in a suitable manner such as the one which will be described subsequently to form the layered tube 10 of the present invention. Such conductive material can either be blended into the melt-processible fluoroplastic terpolymeric material so as to be integrated into the structure of the polymer or can be incorporated during polymerization of the components that make up the fluoroplastic material. Without being bound to any theory, it is believed that carbon-containing materials such as carbon black may be incorporated during the terpolymerization process of the surrounding fluoroplastic material. Material such as stainless steel is more likely to be blended into the structure of the polymer. One suitable material which can be successfully employed in the inner sublayer 12B is the proprietary composition THV 500 conductive an HFP/ETFE/vinylidene fluoride terpolymeric composition commercially avaiable from 3M. This material has the physical characteristics outlined in Table I.

TABLE I

TYPICAL CHARACTERISTICS OF SELECTED FLUORINATED TERPOLYMERS

| | THV 500 | THV 500 CONDUCTIVE | TEST METHOD |
| --- | --- | --- | --- |
| Melt Temp °C. | 165–180 | 165–180 | DSC |
| Elongation at break (%) | 500–600 | 500–600 | ASTM 638 |
| Specific Gravity (g/cc) | 1.95–1.98 | | ASTM-792 |
| Tensile Stress at Break (N/mm$^2$) | 20/Nmm$^2$ | 20/Nmm$^2$ | ASTM 638 |
| Melt Flow Index, Pellets, Powder | 5 to 25 (265 C/5 kg) | 5 to 25 (265 C/5 kg) | ASTM 1238 |
| Limiting Oxygen Index | 75 | 75 | ASTM 2863 |

In both the first and second embodiments, the outer layer 14 is disposed in radial overlying relationship to the inner layer 12 and attached thereto in an essentially permanent manner so as to prevent separation between the two layers by delamination or other means. In the present invention, the innermost portion of the outer layer 14 directly contacts the outer surface of the inner layer 12 and is attached thereto. The outwardly oriented surface 16 of the outer layer 14 is radially opposed to the junction between the inner layer 12 and the outer layer 14 and the outwardly oriented surface 16 is directly contactable with the environment external to the tube 10. The outer layer 14 is composed of a melt processable extrudable thermoplastic material which is resistant to ultraviolet degradation, extreme changes in heat and exposure to environmental hazards such as zinc chloride and resistant to degradation upon contact with engine oil and brake fluid. Suitable materials would be those which can be co-extruded with the interior flurcopolymeric inner layer and attach securely thereto. Suitable resinous materials include acrylate materials, polyester materials, bromoisylbutene-isoprene materials, polybutadiene, chlorinated butylrubber, chlorinated polyethene, polychloromethyloxirane, chloroprene, chlorosulfonylpolyethylene, ethylene oxide and chloromethyloxriane polymers. Suitable polymeric materials can also include ethylenepropylenediene terpolymer, ethylenepropylene copolymers, polyether urethanes, isoprene, isobuteneisoprene, nitrylbutadiene, polyamide, polyvinylchloride, styrenebutadiene, polysulfides, polyolefins, polyphenylsulfides.

Melt-processible polyamides are employed in the outer layer 14 in the preferred embodiment. Suitable polyamides are selected from the group consisting of Nylon 11, Nylon 12, Nylon 6.6 and zinc-chloride resistant Nylon 6.

The preferred polyamide employed is a material which is capable, when extruded as the outer layer of the tubing of the present invention, of providing the finished tubing with a cold impact resistance (as determined by test methods outlined in SAEJ844D and ISO7628) of at least 2 foot pounds at –20° C.

Polyamides such as Nylon 12 can be effectively employed. In order to attain impact resistance of 2 foot pounds at –20° C. the Nylon 12 material can include various modifiers which are generally held as proprietary trade secrets by the various manufacturers of such materials. It is known that such materials can contain various plasticizers and are generally called "impact modified". In the present invention, polyamides containing up to 17% by composition weight plasticizers can be employed; with amounts between about 1 and about 13% being preferred. Examples of suitable Nylon 12 materials which can be employed in the present invention include impact resistance modified Nylon 12 which are commercially available.

The outer layer 14 can also be made up of polyamides such as Nylon 6, which are resistant to degradation upon exposure to zinc chloride. Polyamides, such as Nylon 6 employed in the outer layer 14 can either inherently exhibit sufficient resistance to zinc chloride or contain effective amounts of suitable modifying agents to achieve such resistance to degradation upon exposure to zinc chloride. Polyamides such as Nylon 6, employed in the outer layer 14 can also be modified with various plasticizers, flame retardants and the like.

Nylon 6 employed in the outer layer 14 is generally derived from the condensation polymerization of caprolactam and is commonly referred to as a 6-carbon block polyamide. In the preferred embodiment, the 6-carbon block polyamide employed in the outer layer 14 contains sufficient quantities of modifying agents to impart a level of zinc chloride resistance greater than or equal to that required by test method SAEJ844; nonreactivity after 200 hour emersion in a 50% by weight aqueous zinc chloride solution. Where a 6-carbon block polyamide based material is employed, it is preferred that the material be a multi-component system comprised of a Nylon-6 polymer blended with other Nylons and aliphatic compounds. The zinc chloride resistant Nylon-6 of choice will have a melt temperature between about 220° C. and about 240° C. Examples of thermoplastic Nylon 6 materials suitable for use in the tubing of the present invention are proprietary materials which can be obtained commercially under the tradenames M-7551 from NYCOA Corporation and ALLIED 1779 from Allied Chemical.

Nylon 6 material employed in the outer layer 14 can include other modifying agents such as various plasticizing agents. Such plasticizing agents can be present in amounts between about 1.0% and about 13% by total weight of the polyamide material and be successfully employed in the present invention. Suitable Nylon 6 materials either are inherently capable of withstanding impacts of at least 2 foot pounds at temperatures below about −20° C. or are impact modified to attain this level of resistance.

The tube 10 can be prepared by any suitable coextrusion process. The coextrusion process can be one capable of producing a dual layer tube such as that described in the first embodiment. However, it is understood that the second embodiment of the tube 10 can be prepared by the addition of an additional coextruder which is within the purview of the skilled artisan.

In the coextrusion process for the tubing 10 of the present invention, the extrusion temperature of the fluorinated terpolymeric material is preferably between 180° and 225° C. with an extrusion temperature between 190° and 205° C. being most preferred. The temperature of the polymeric material can vary within these ranges depending upon the zone of the extrusion cylinder. Preferably, the cylinder is divided into four zones in which the temperature is gradually brought up to extrusion temperature. In Zone One, the temperature of the thermoplastic fluoropolymer is held between about 145° and 160° C. with a temperature between 150° and 160° C. being preferred. The thermoplastic fluoropolymer experiences a temperature elevation in Zone Two to a range between about 165° and 185° C. with a range between 170° and 180° C. being preferred. In Zone Three, the temperature is elevated to a range between about 175° and 195° C., with a range between 180° and 190° C. being preferred. The temperature in zone four is between 195° and 210° C. with a range between about 195° and 205° C. being preferred. The temperature of the thermoplastic fluoropolymeric mixture in the head is generally between about 190° and 200° C. with the temperature as it reaches the extrusion die being about 200° to 210° C.

The line speed for the extruded material can vary depending upon the tubing dimension and wall thickness. In general, a line speed between 1.0 m/min. and about 2.5 m/min is preferred.

The tube 10 which results from the coextrusion process will have an exteriorly oriented surface which is in direct contact with the exterior environment and is resistant to environmental degradation and an interiorly oriented surface which is brought into direct contact with the fuel material. The interiorly oriented surface is composed of a fluoropolymeric material which is chemically dissimilar to the thermoplastic material employed in the layer containing the exteriorly oriented surface.

What is claimed is:

1. An elongated fuel and vapor tube used in conjunction with an internal combustion engine in a motor vehicle system to handle fluids containing hydrocarbons comprising:

a first layer disposed radially innermost and having an inner surface capable of prolonged exposure to a fluid containing hydrocarbon and an outer surface spaced a first predetermined radial thickness from the inner surface, the first layer composed of an extrudable, melt processible terpolymer consisting essentially of:

a fluorinated alkylene having between 2 and 4 carbon atoms and between 2 and 4 fluorine atoms;

an α-fluoro olefin having between 2 and 6 carbon atoms and between 2 and 6 fluorine atoms; and a fluorinated vinyl compound selected from the group consisting of vinylidene fluoride, vinyl fluoride and mixtures thereof;

a second layer bonded to the first layer, the second layer having a second predetermined thickness greater than the thickness of the first layer, the second layer uniformly connected to the first layer and consisting essentially of a melt processible thermoplastic capable of sufficiently permanent laminar adhesion to the first layer to prevent delamination during desired lifetime of the tube wherein the melt-processible thermoplastic resin is selected from the group consisting of, bromoisobutene-isoprene resins, polybutadiene, chlorinated butylrubber, chlorinated polyethylene, polychloromethoxirane, chloroprene, chlorosulfonopylyethylene, ethyleneoxide, terpolymers of ethylenepropylenediene, copolymers of ethylenepropylene, isobutene-isoprene, nitryl butadiene, styrenebutadiene, polysulfide, polyphenolsulfide and polysulfones.

2. The elongated fuel and vapor tube of claim 1 wherein the tube has a passive hydrocarbon permeation rate less than about 0.5 g/m² in a 24 hour interval.

3. The elongated fuel and vapor tube of claim 1 wherein the tube has a tensile stress at break of at least 15 N/mm² and a burst strength at 23° C. and 120° C. of at least 20 bar.

4. The elongated fuel and vapor tube of claim 1 wherein the tube has an elongation at break of at least 150%.

5. The elongated fuel and vapor tube of claim 1 wherein the tube is capable of withstanding an impact of 2 footpounds at temperatures below about −20° C.

6. The elongated fuel and vapor tube of claim 1 wherein the melt processible thermoplastic in the second layer is selected from the group consisting of bromoisobutene-isoprene resins, polybutadiene, chlorinated butylrubber, chlorinated polyethylene, polychloromethoxirane, chloroprene, chlorosulfonopylyethylene, ethyleneoxide, terpolymers of ethylenepropylenediene, copolymers of ethylenepropylene, isobutene-isoprene, nitryl butadiene, styrenebutadiene, polysulfide, polyphenolsulfide and polysulfones.

7. The elongated fuel and vapor tube of claim 1 wherein the melt processible thermoplastic in the second layer is a polyamide material selected from the group consisting of Nylon 11, Nylon 12, Nylon 6.6, and zinc chloride resistant Nylon 6.

8. The elongated fuel and vapor tube of claim 7 wherein the polyamide material has an ability to withstand an impact of 2 foot-pounds at −20° C. and has an elongation value greater than 150% at 23° C.

9. The elongated fuel and vapor tube of claim 8 wherein the polyamide material is Nylon 12.

10. The elongated fuel and vapor tube of claim 8 wherein the polyamide material is zinc-chloride resistant Nylon 6.

11. The elongated fuel and vapor tube of claim 8 wherein the tube has a total wall thickness between about 0.8 and about 1.5 mm and an outer diameter up to about 50 mm.

12. The elongated fuel and vapor tube of claim wherein the second layer is between 30% and 70% of the total wall thickness.

13. The elongated fuel and vapor tube of claim 7 wherein the extrudable melt processible terpolymer employed in the first layer consists essentially of:
- a fluorinated alkylene selected from the group consisting of tetrafluoroethylene, polytetrafluoroethylene, and mixtures thereof;
- an α-fluoro olefin selected from the group consisting of hexafluoropropene, perfluorobutene, perfluoroisobutene and mixtures thereof; and
- vinylidene fluoride.

14. The elongated fuel and vapor tube of claim 13 wherein said tube has an outer diameter up to 50 mm and a total wall thickness between about 0.5 mm and about 2 mm.

15. The elongated fuel and vapor tube of claim 7 wherein said first layer comprises:
- an innermost sublayer disposed radially interior, said innermost sublayer defining the inner surface capable of prolonged exposure to a fluid containing hydrocarbons and an opposed sublayer surface spaced a predetermined radial thickness from the inner surface, the innermost sublayer being capable of dissipating electrostatic energy in a range between about $10^4$ to $10^{10}$ ohm/cm$^2$; and
- a secondary sublayer interposed between the innermost sublayer and the second layer having a predetermined thickness greater than the thickness of the innermost sublayer;
- wherein fluorinated terpolymer employed in the innermost and secondary sublayers is chemically similar.

16. The elongated fuel and vapor tube of claim 1 wherein said first layer comprises:
- an innermost sublayer disposed radially interior, said innermost sublayer defining the inner surface capable of prolonged exposure to a fluid containing hydrocarbons and an opposed sublayer surface spaced a predetermined radial thickness from the inner surface wherein the innermost sublayer contains quantities of a conductive material in an amount less than about 5% by volume; and
- a secondary sublayer interposed between the innermost sublayer and the second layer having a predetermined thickness greater than the thickness of the innermost sublayer;
- wherein fluorinated terpolymer employed in the innermost and secondary sublayers is chemically similar.

17. The elongated fuel and vapor tube of claim 16 wherein the conductive material is selected from the group consisting of elemental carbon, copper, silver, gold, nickel, silicon, and mixtures thereof.

18. The elongated fuel and vapor tube of claim 16 wherein the conductive material is present in an amount less than about 5% by volume of the fluoroplastic material employed in the innermost sublayer.

19. The elongated fuel and vapor tube of claim 16 wherein the conductive material is elemental carbon and is incorporated during the terpolymerization process.

20. The elongated fuel and vapor tube of claim 16 wherein the melt processible thermoplastic in the second layer is a polyamide selected from the group consisting of Nylon 11, Nylon 12, Nylon 6.6, and zinc chloride resistant Nylon 6.

21. The elongated fuel and vapor tube of claim wherein the polyamide material has an ability to withstand an impact of 2 foot-pounds at −20° C. and an elongation value of at least 150% at 23° C.

22. The elongated fuel and vapor tube of claim 20 wherein the polyamide material is Nylon 12.

23. The elongated fuel and vapor tube of claim 20 wherein the polyamide material is zinc chloride resistant Nylon 6.

24. An elongated fuel and vapor tube for connection to a motor vehicle system to handle fluids containing hydrocarbons comprising:
- a first layer disposed radially innermost and having an inner surface capable of prolonged exposure to organic fluid and an outer surface spaced a first predetermined radial thickness from the inner surface, the first layer composed of an extrudable, melt processible fluoroplastic terpolymer consisting essentially of:
- a polyfluorinated alkylene selected from the group consisting of tetrafluoroethylene, polytetrafluoroethylene and mixtures thereof;
- an α-fluoro olefin selected from the group consisting of hexafluoropropene, perfluorobutene, perfluoroisobutene and mixtures thereof; and
- vinylidene difluoride;
- a second layer having a second predetermined thickness, an inner face directly contacting and bonded to the first layer and an opposed outer face adapted to directly contact environment external to the elongated fuel and vapor tube, the second layer composed of a melt processible thermoplastic selected from the group consisting of Nylon 11, Nylon 12, zinc chloride resistant Nylon 6, and Nylon 6.6, the thermoplastic capable of sufficiently permanent laminar adhesion to the first layer to prevent delamination during desired lifetime of the tube;
- wherein the elongated fuel and vapor tube has a passive hydrocarbon permeation rate less than about 0.5 g/m$^2$ in a 24 hour interval.

25. The elongated fuel and vapor tube of claim 24 wherein said first layer comprises:
- an innermost sublayer disposed radially interior, said innermost sublayer defining the inner surface capable of prolonged exposure to a fluid containing hydrocarbon and an opposed sublayer surface spaced a predetermined radial thickness from the inner surface, the innermost sublayer being capable of dissipating electrostatic energy in a range between about $10^4$ to $10^{10}$ ohm/cm$^2$; and
- a secondary sublayer interposed between the innermost sublayer and the second layer having a predetermined thickness greater than the thickness of the innermost sublayer
- wherein fluorinated terpolymer employed in the innermost and secondary sublayers is chemically similar.

26. The elongated fuel and vapor tube of claim 24 wherein said first layer comprises:
- an innermost sublayer disposed radially interior, said innermost sublayer defining the inner surface capable of prolonged exposure to a fluid containing hydrocarbon and an opposed sublayer surface spaced a predetermined radial thickness from the inner surface, wherein the innermost sublayer contains quantities of a conductive material selected from the group consisting of elemental carbon, copper, silver, gold, nickel, silicon, and mixtures thereof, the conductive material present in an amount sufficient to provide electrostatic dissipation capability in a range less than about 5% by volume; and a secondary sublayer interposed between the innermost sublayer and the second layer having a predetermined thickness greater than the thickness of the innermost sublayer wherein fluorinated terpolymer employed in the innermost and secondary sublayers is chemically similar.

27. An elongated fuel and vapor tube used in conjunction with an internal combustion engine in a motor vehicle system to handle fluids containing hydrocarbons comprising:

a first layer disposed radially innermost and having an inner surface capable of prolonged exposure to a fluid containing hydrocarbon and an outer surface spaced a first predetermined radial thickness from the inner surface, the first layer composed of an extrudable, melt processible terpolymer consisting essentially of:

a fluorinated alkylene selected from the group consisting of tetrafluoroethylene, polytetrafluoroethylene, and mixtures thereof;

an α-fluoro olefin selected from the group consisting of hexafluoropropene, perfluorobutene, perfluoroisobutene and mixtures thereof; and vinylidene fluoride; and a second layer having a second predetermined thickness greater than the thickness of the first layer, the second layer uniformly connected to the first layer and consisting essentially of a melt processible thermoplastic capable of sufficiently permanent laminar adhesion to the first layer to prevent delamination during desired lifetime of the tube.

28. The elongated fuel and vapor tube of claim 27 wherein said first layer comprises:

an innermost sublayer disposed radially interior, said innermost sublayer defining the inner surface capable of prolonged exposure to a fluid containing hydrocarbon and an opposed sublayer surface spaced a predetermined radial thickness from the inner surface, the innermost sublayer being capable of dissipating electrostatic energy in a range between about $10^4$ and $10^9$ ohm/cm$^2$; and a secondary sublayer interposed between the innermost sublayer and the second layer having a predetermined thickness greater than the thickness of the innermost sublayer.

29. The elongated fuel and vapor tube of claim 26 wherein said first layer comprises:

an innermost sublayer disposed radially interior, said innermost sublayer defining the inner surface capable of prolonged exposure to a fluid containing hydrocarbon and an opposed sublayer surface spaced a predetermined radial thickness from the inner surface, wherein the innermost sublayer contains quantities of a conductive material selected from the group consisting of elemental carbon, copper, silver, gold, nickel, silicon, and mixtures thereof, the conductive material present in an amount less than 5 percent by volume; and a secondary sublayer interposed between the innermost sublayer and the second layer having a predetermined thickness greater than the thickness of the innermost sublayer.

* * * * *